United States Patent [19]
Brueggen et al.

[11] Patent Number: 6,068,062
[45] Date of Patent: May 30, 2000

[54] FLEXIBLE FRAME FOR A MULTI-SECTION IMPLEMENT

[75] Inventors: Shane Julius Brueggen, Geneseo; Robert Edwin Bennett, Moline; William Douglas Graham, East Moline; Richard Hugo Clark, Geneseo, all of Ill.

[73] Assignee: Deere & Company, Moline, Ill.

[21] Appl. No.: 09/074,121

[22] Filed: May 7, 1998

[51] Int. Cl.[7] .................................................. A01B 49/00
[52] U.S. Cl. ............................................................ 172/311
[58] Field of Search .................................. 172/248, 311, 172/456, 776, 310, 657, 676, 677

[56] References Cited

U.S. PATENT DOCUMENTS

| | | | |
|---|---|---|---|
| 4,058,170 | 11/1977 | Ankenman et al. | 172/311 |
| 4,102,404 | 7/1978 | Krammer | 172/310 |
| 4,105,077 | 8/1978 | Seifert, Jr. | 172/311 |
| 4,186,805 | 2/1980 | Repski | 172/248 |
| 4,619,330 | 10/1986 | Machnee | 172/311 |
| 4,653,592 | 3/1987 | Friggstad | 172/311 |
| 4,790,389 | 12/1988 | Adee et al. | 172/776 |
| 4,840,233 | 6/1989 | Friggstad et al. | 172/311 |
| 4,977,964 | 12/1990 | Friggstad et al. | 172/310 |

*Primary Examiner*—Robert E. Pezzuto

[57] ABSTRACT

A flexible frame structure for an implement includes a wing frame section with several fore-and-aft spaced, transversely extending rank tubes that are connected to surrounding support structure with conventional, non-resilient pin joints for rotation about a fore-and-aft extending horizontal rank axis. A transversely extending rear rank tube is rigidly connected to a fore-and-aft extending caster wheel support frame which extends forwardly above the ends of the rank tubes. A caster wheel projects forwardly from the end of the support frame out of interfering relationship with the forward tool-carrying rank. The rear rank tube and caster wheel support frame define a rigid L-shaped member which is connected to the adjacent frame section by a conventional pin and pivot structure for rotation about a first axis corresponding to the rank axis, and a second axis perpendicular to the forward direction. A diagonal brace has a leading end pivotally connected to the surrounding support structure and a trailing outer end connected near the vertex area of the L-shaped member for pivoting about a transverse axis. The non-resilient pin joints connect the outer ends of the rank tubes to the underside of the fore-and-aft leg of the L-shaped member, and pin hole clearances allow the frame section to distort for the implement flexibility, without rotation of the rank tubes, when operating on irregular ground surfaces. Centrally located fore-and-aft links are connected between the ranks for further rank rotational resistance.

20 Claims, 4 Drawing Sheets

FLEXIBLE FRAME FOR A MULTI-SECTION IMPLEMENT

BACKGROUND OF THE INVENTION

1) Field of the Invention

The present invention relates generally to agricultural implements and, more specifically, to flexible frame structure for large folding implements such as air drills.

2) Related Art

Large folding implements including a tillage type frame have sections hinged together for folding about fore-and-aft axis for movement between a folded or raised transport position and unfolded field-working position. One problem with many such implements is lack of flexibility of the frame which results in uneven working depth of the tools in non-level ground conditions. If the implement is used for seeding, the planting depth can vary unacceptably, and the openers can actually lift out of the ground in some conditions. To alleviate problems caused by relatively inflexible frames, some large implements, such as the Flexi-Coil model 5000 air hoe drill, provide frames with opener-carrying tubes supported by resilient joints. One type of flexible joint arrangement is shown in U.S. Pat. No. 4,977,964 which is assigned to Flexi-Coil Limited. Although such a frame structure provides flexibility to follow irregular ground contours, the resilient joints allow the frame tubes and openers mounted thereon to rotate about an axis perpendicular to the direction of travel. Such rotations results in inconsistent opener depth control. The resilient joints require specially manufactured components that are subject to wear. Providing frame section flexibility without excessive section distortion and rotation of the frame tubes has been a continuing problem.

Another type of large frame for tillage implements, such as shown in U.S. Pat. No. 4,102,404 issued to Kelly A. Krammer, has a frame section that utilizes a generally L-shaped frame member having an aft transverse member connected to an adjacent frame section by a universal joint and a front transverse member connected by a universal joint to the end of the L-shaped member. Only two ranks are available for mounting tools on such a frame section, and a large front brace member is necessary to provide fore-and-aft stability for the section. The frame also requires ground wheels supported under portions of the front and aft transverse members, and the wheels limit flexibility in the available spacing arrangements of the openers or other tools on the transverse members. Further types of flexible frame structures include special hinge joints between sections or angled axis arrangements, and many require relatively massive forward hitch or brace structure extending between all the sections.

BRIEF SUMMARY OF THE INVENTION

It is therefore an object of the present invention to provide an improved flexible frame structure for a large folding implement. It is a further object to provide such a structure which overcomes most or all of the aforementioned problems.

It is a further object of the present invention to provide an improved flexible frame structure for a large folding implement wherein frame section flexibility is provided from section to section for good depth control over irregular ground surfaces. It is another object to provide such a frame structure that allows frame section distortion necessary for section flexibility and yet has better section stability than at least most previously available flexible frame arrangements. It is a further object to provide such a structure which eliminates need for large forward brace or hitch structure for fore-and-aft stability of a flexible frame section.

It is still another object to provide such a frame structure that eliminates unnecessary rotation of the frame tubes about axes perpendicular to the direction of travel for more consistent depth control during field-working operations. It is still another object to provide such a structure utilizing conventional pin joints and universal joints without need for special flexible connectors. It is yet a further object to provide such structure having an improved support wheel arrangement providing better tool spacing flexibility than at least many previously available large flexible frame structures.

A flexible frame structure constructed in accordance with the teachings of the present invention includes wing frame sections with several fore-and-aft spaced, transversely extending independent frame or rank tubes that are connected to surrounding support structure with conventional, non-resilient pin joints for pivoting about a fore-and-aft extending horizontal rank axis (an axis in the direction of travel) while resisting rotation of the tubes about their length. Another transversely extending rank tube is located at the aft of the frame section and is rigidly connected to a fore-and-aft extending caster wheel support frame which extends forwardly above the ends of the rank tubes. The caster wheel projects forwardly from the end of the support frame out of interfering relationship with the forward tool-carrying rank. The rear rank tube and caster wheel support frame define a rigid L-shaped member which is connected at the top or end of the long leg of the L to the aft corner of the adjacent frame section by a conventional pin and pivot structure for rotation in two directions. The L-shaped member has a fore-and-aft axis of rotation, and an axis of rotation perpendicular to the forward direction. The aft end of the L-shaped frame is supported by press wheels or other support wheel arrangement adjustably connected to the rear rank tube. A diagonal brace has a leading end pivotally connected to the surrounding support structure for rocking about the fore-and-aft extending rank axis, and a trailing outer end connected near the vertex area of the L-shaped member for pivoting about a transverse axis lying closely adjacent the axis of rotation perpendicular to the forward direction. The non-resilient pin joints defining outer transverse pivot axes connect the outer ends of the rank tubes to the underside of the fore-and-aft leg of the L-shaped member, and pin and hole clearances allow the frame section to distort for the implement flexibility, without unnecessary rotation of the rank tubes, when operating on irregular ground surfaces. Fore-and-aft links are connected between the ranks with pivotal connections having axes corresponding to the outer transverse pivot axes for further rank rotational resistance. By aligning the link pivot axes with the outer transverse pivot axes, good field load response is provided without rank binding or wind-up when the frame is flexed. The sections are pivotable about fore-and-aft extending axes between an unfolded field-working position and a folded transport position, and forward brace or hitch structure extending generally the width of the unfolded sections is eliminated.

These and other objects, features and advantages of the present invention will become apparent to one skilled in the art upon reading the following detailed description in view of the drawings.

DETAILED DESCRIPTION OF THE DRAWINGS

Figure 1:
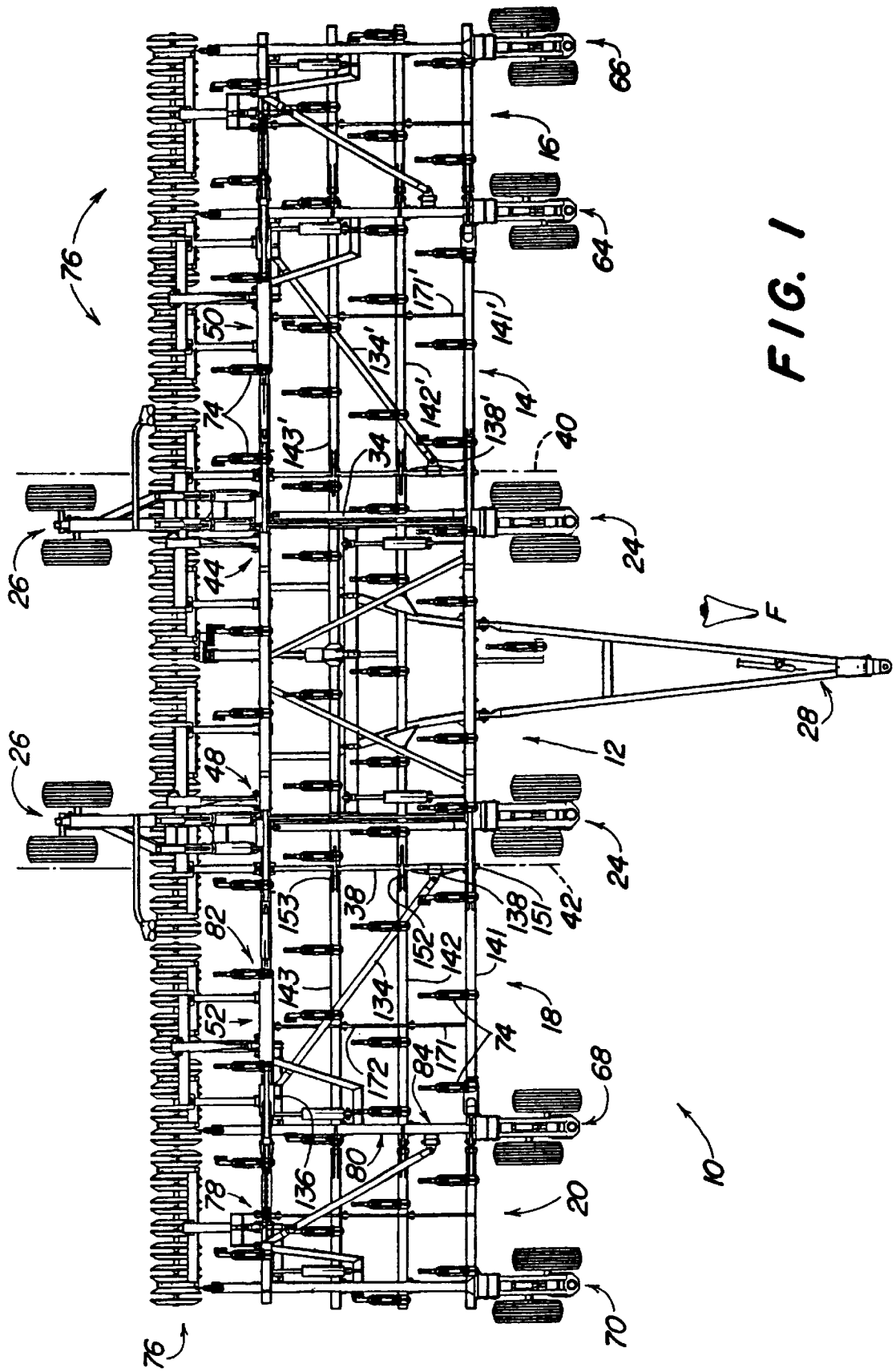
FIG. 1 is a top view of a multi-section implement having a flexible frame.

Referring now to FIG. 1, therein is shown an implement 10 having a main frame section 12, and left and right inner and outer flexible wings or frame sections 14, 16 and 18, 20. The main frame section 12 is supported in a raised transport position by forward lift wheel assemblies 24 and aft transport wheel assemblies 26, and a forward hitch 28 is connected to a tractor (not shown) for forward movement of the implement 10 over the ground. The inner wings 14 and 18 are pivotally connected to outer fore-and-aft extending support members 34 and 38 at the sides of the frame section 12 for rocking about fore-and-aft extending hinge axes 40 and 42. Inner wing lift cylinder assemblies 44 and 48 connected between the section 12 and the inner wings 14 and 18 move the wings from unfolded working positions (shown) to upright positions to narrow the implement 10 for road transport. The outer wings 16 and 20 are pivotally connected to outermost portions of the inner wings 14 and 18 for rocking about fore-and-aft extending axes. Wing fold cylinder assemblies 50 and 52 connected between the inner and outer wings move the wings 16 and 20 between unfolded working positions (shown) and positions folded against the adjacent inner wings 14 and 18 for transport.

Figure 2:
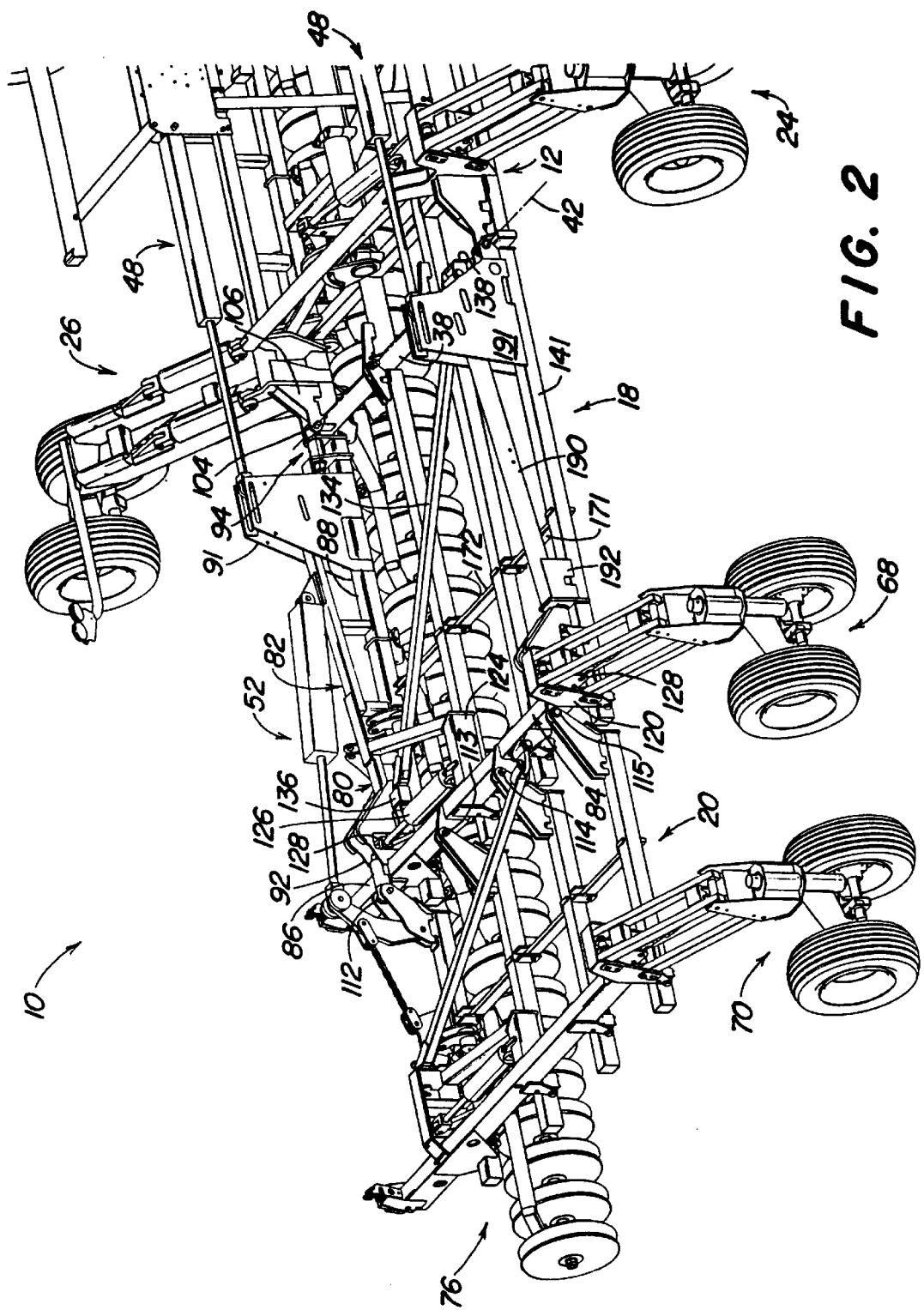
FIG. 2 is a perspective view of the right front portion of the implement of FIG. 1.
Figure 4:
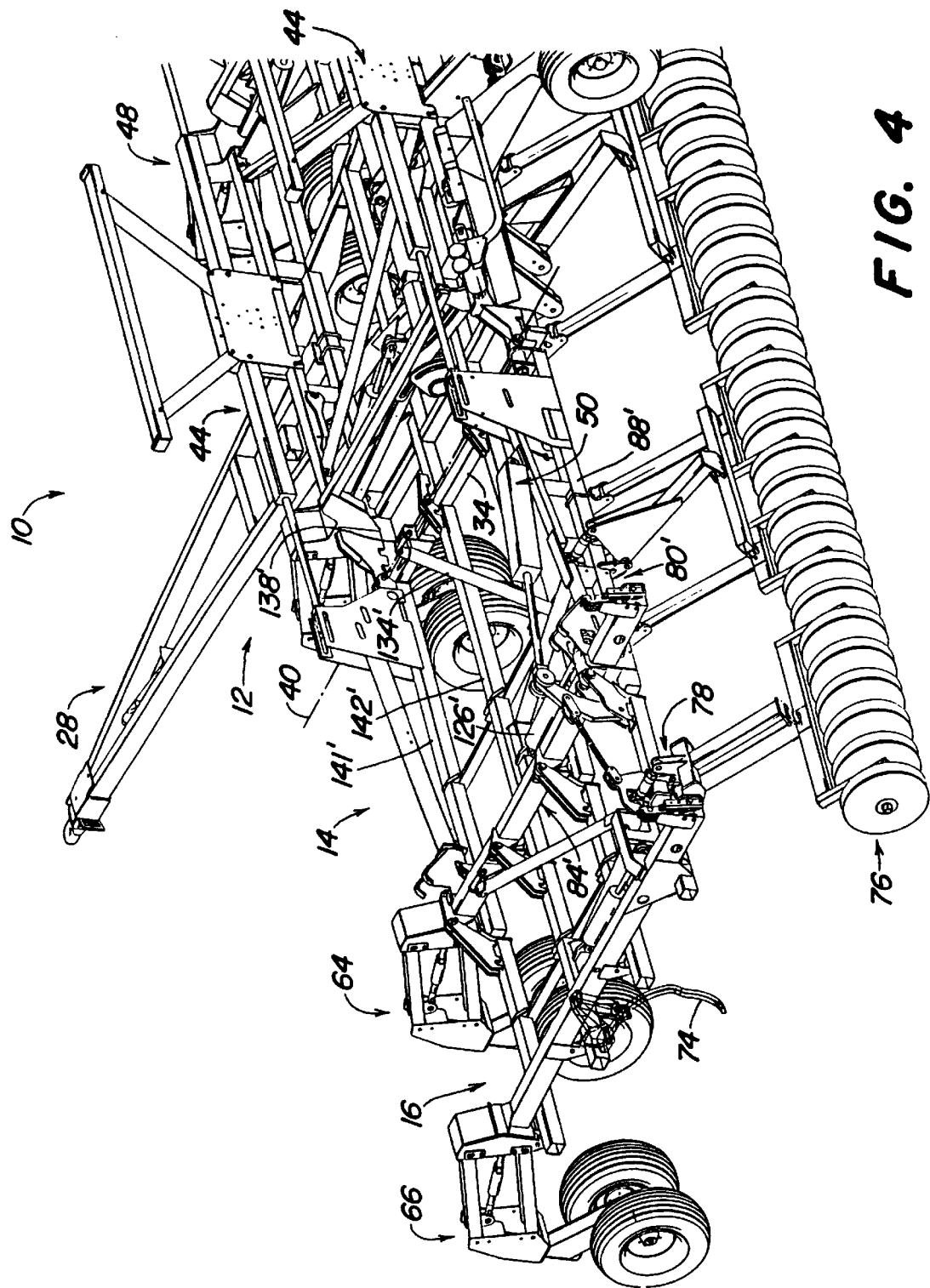
FIG. 4 is a perspective view of the left rear portion of the implement of FIG. 1.

Forward caster wheel assemblies 64, 66, 68 and 70 project forwardly from the wing sections 14, 16, 18 and 20, respectively. Openers or other earthworking tools 74 (FIG. 1) are transversely spaced in at least three ranks on the sections 12, 14, 16 and 18, and the wheel assemblies 24, 26, 64, 66, 68 and 70 are spaced fore-and-aft of the frame sections out of interfering relationship with the ranks for maximum tool spacing flexibility. As shown in FIG. 1, the implement 10 is an air drill and includes trailing press wheel assemblies 76 adjustably connected to the rear ranks by pivot structure 78. The assemblies 76 provide support and depth control for the frame sections when the implement 10 is operating in the field with the wheel assemblies 26 raised from the ground (FIGS. 2 and 4). In other operations that do not require press wheels, additional wheel assemblies can substituted for the press wheel assemblies 76.

Although a five-section implement is shown, it is to be understood that the flexible frame section described below can be utilized with implements having a different number of sections. Since the section 14 is generally the mirror image of the section 18, and the smaller outer sections 16 and 20 are constructed similarly to the sections 14 and 18, only the section 18 will be described below. However, the principles and operation described for section 18 apply in a similar manner to the remaining wing sections. Portions identified on the section 14 are labeled with the same reference numeral as corresponding portions on the section 18, but a prime is added to the numerals for the section 14.

Figure 3:
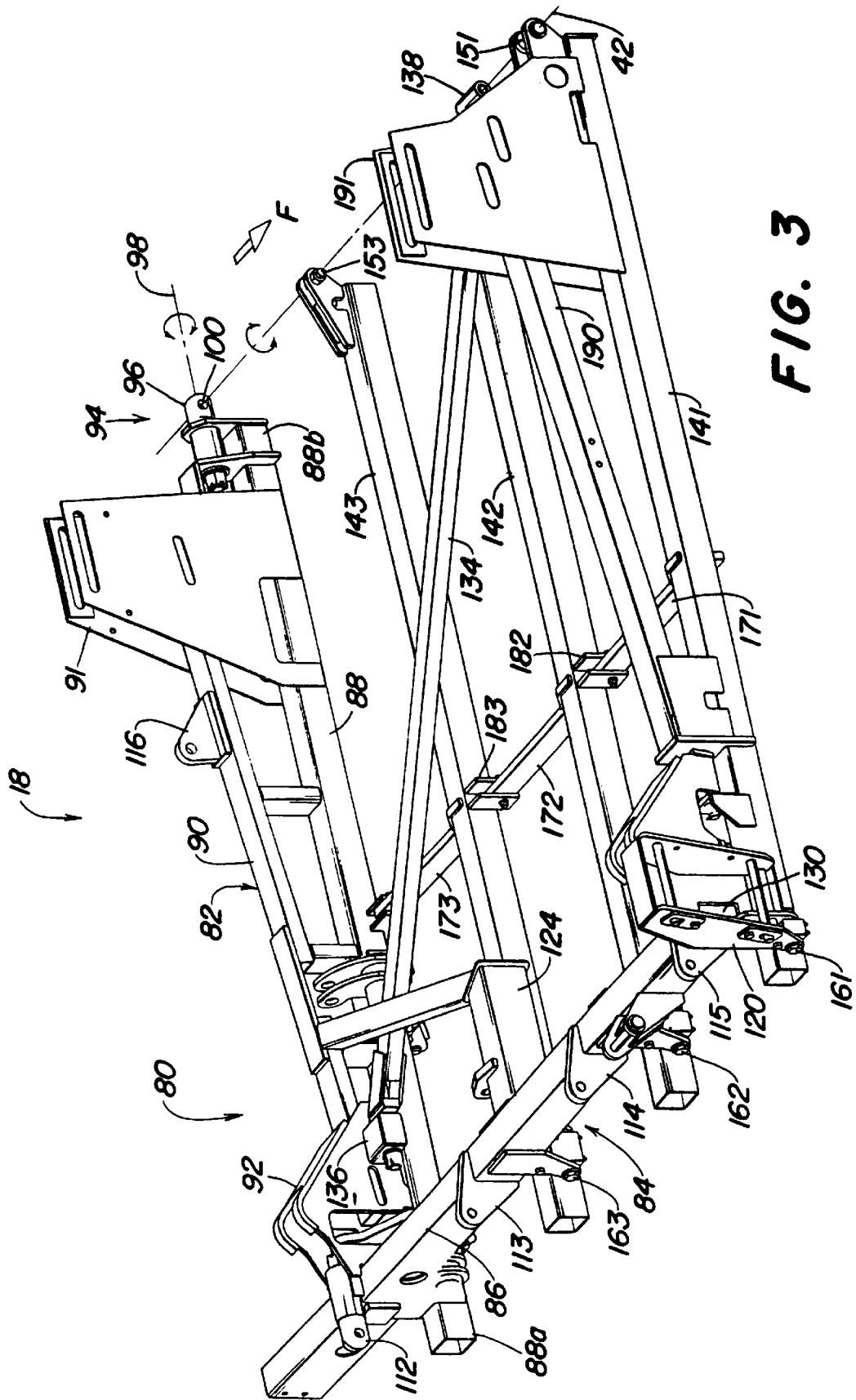
FIG. 3 is a an enlarged perspective view of the right inner wing frame section for the implement shown in FIG. 2.

Referring now to FIGS. 1–3, flexible section 18 includes an L-shaped support frame 80 generally horizontally disposed with a transversely extending long leg section 82 and a forwardly projecting base leg section 84 connected at right angles at a vertex 86 to define the L. The leg section 82 includes a rear, tool supporting rank tube 88 having an outer end 88a fixed to the base leg section 84 and a brace 90 extending between a support 91 for the rod end of the rear cylinder assembly 48 and outer hinge support structure 92. The rank tube 88 includes an innermost end 88b connected to pivot structure 94 including a pivot pin 96 defining a transversely extending support frame pivotal axis 98. The pin 96 includes a bore 100 having an axis corresponding to the hinge axis 42. A pin 104 (FIG. 2) extending through the bore 100 and through a folding hinge bracket 106 on the main frame section 12 pivotally connects the support frame 80 to the section 12 for rocking about the axis 42 between the folded and unfolded positions. The pivot structure 94 allows the frame 80 to pivot about the transverse axis 98 as the frame 18 flexes.

Hinge structures 112, 113, 114 and 115 extend upwardly and outwardly from the section 84 to connect the outer wing section 20 to the section 18. A folding cylinder bracket 116 for the outer wing fold cylinder is connected to the top side of the brace 90. The forward end of the leg section 84 includes a wheel support bracket 120 which supports the wheel assembly 68. The frame 80 includes a wheel cylinder support 124 near the vertex 86, and a cylinder 126 (FIG. 2) is connected to the support and to a lift linkage 128. The linkage 128 extends through the leg section 84, which is of hollow tubular construction, and through an aperture 130 (FIG. 3) in the wheel support bracket 120 to a connection with the wheel assembly 68 for raising and lowering the frame 80.

A diagonal link 134 includes an aft end hinged at 136 to the support structure 92 for pivoting about a transversely extending axis located near the axis 98 of the pivot structure 94. The forward end of the link 134 is hingedly connected at 138 to the adjacent support member 38 for pivoting about the fore-and-aft extending hinge axis 42. The link 134 Is also connected for pivoting about an upright axis (see the detail at 138' in FIG. 4) near the hinge axis 42.

Three independent rank tubes 141, 142 and 143 include inner ends hinged at locations 151, 152 and 153, respectively, to the adjacent support member 38 for pivoting about the hinge axis 42. The inner hinge connections allow rank tube pivoting primarily about a fore-and-aft extending axis, but the narrowness of the hinge connections allows for a small amount of rotation about a transverse tube axis before the tube begins to deflect. The outer ends of the tubes 141, 142 and 143 are pivotally connected at pivot locations 161, 162 and 163 (FIG. 3) to the underside of the leg section 84 of the L-shaped frame 80 for pivoting about transversely extending tube connecting axes parallel to and forward of the respective tubes. The pivotal connections at locations 161–163 support the outer ends of the tubes 141–143 from the frame 80 and permit the section 18 to flex as the frame 80 pivots about the transverse axis 98 over irregularities in the ground surface. The diagonal link 134 maintains general rectangularity of the section 18 as outer ends of the tubes 141–143 move vertically relative to each other, and obviate large forward braces or hitch structure attached to the wing sections.

To further restrict tube rotation and help resist fore-and-aft and vertical loading, fore-and-aft extending anti-rotation links 171, 172 and 173 are connected between adjacent rank tubes. The forward end of the link 171 is fixed or wrenched to the rank tube 141, and the aft end of the link is pivotally connected to a bracket 182 fixed to the forward wall of the tube 142 for pivoting about a transverse axis. Likewise, forward ends of the links 172 and 173 are fixed to the tubes 142 and 143 and are pivotally connected at their aft ends to brackets 183 and 184 for rotation about transverse axes. The pivotal axes at the brackets 182 and 183 correspond to the pivotal axes at the locations 162 and 163 to improve frame response under load and to reduce binding or tube wrap-up when the frame 18 is flexed. An upper brace 190 extends between a support 191 for the rod end of the forward cylinder assembly 48 an outer bracket 192.

In field-working operations when the implement 10 encounters surface irregularities, the outer ends of the rank tubes 141,142, 143 and 88 can move vertically relative to each other as the L-shaped support frame 80 pivots about the transverse axis 98 and the fore-and-aft axis 42. For example, if the forward wheel assembly 68 encounters a gulley, the forward end of the leg section 84 rotates downwardly about the axis 98, and the outer ends of the rank tubes pivot downwardly about the axis 42 to maintain the openers 74 in the ground. Each of the sections 14,16,18 and 20 operate in a similar manner over irregular ground surfaces to provide a large range of implement flexibility and ground-following capability.

Having described the preferred embodiment, it will become apparent that various modifications can be made without departing from the scope of the invention as defined in the accompanying claims.

We claim:

1. A flexible frame section for an agricultural implement adapted for movement over the ground in a forward direction and supporting earthworking tools, the frame including an inner section having an outer support area, the flexible frame section including:

at least first and second fore-and-aft spaced, transversely extending tool-carrying ranks having innermost ends pivotally connected to the outer support area for pivoting about a fore-and-aft extending rank axis, the ranks including outermost ends;

a support frame having a rear tool-carrying rank pivotally connected to the outer support area for rocking about a fore-and-aft extending support frame axis, the support frame further including an outer leg extending forwardly from the rear rank to a leg end supporting a ground wheel forwardly of the first rank out of interfering relationship with the first rank so that the tools can be spaced along substantially the length of the first rank without interference from the outer leg and the wheel; and rank end support structure connecting the outermost ends to the outer leg of the support frame and facilitating vertical movement of the outermost ends of the ranks relative to each other about the fore-and-aft extending axis for frame section flexibility without unnecessary rotation of the ranks about their length to thereby minimize tool depth of penetration variations resulting from rank rotation during field-working operations.

2. The frame section as set forth in claim 1 wherein the support frame is rigid and pivotable about an axis transverse to the forward direction to accommodate relative vertical movement of the outermost ends of the ranks while limiting components of rotation about the lengths of the ranks.

3. The frame section as set forth in claim 1 wherein the fore-and-aft extending support frame axis corresponds to the fore-and-aft extending rank axis to facilitate pivoting of the flexible frame section about the rank axis.

4. The frame section as set forth in claim 1 wherein the support frame is rigid and L-shaped, and further comprising a diagonal brace pivotally connected to the outer support area and to a vertex area of the L-shaped support frame and limiting movement of the ranks away from the transverse orientation during frame flexing independently of forward hitch structure.

5. The frame section as set forth in claim 2 including a universal joint connecting the support frame to the outer support area rearwardly of the second rank, the universal joint defining the axis transverse to the forward direction, and support wheel structure connected to the rear rank.

6. The frame section as set forth in claim 5 further comprising a diagonal brace connected between the a forward portion of the outer support area and the rear rank.

7. The frame section as set forth in claim 2 wherein the outermost ends of the ranks are pivotally connected to the outer leg of the support frame by outer pivots having transversely extending pivot axes.

8. The frame section as set forth in claim 7 further comprising anti-rotation links and nonresilient connecting structure connecting the links between adjacent ranks.

9. The frame section as set forth in claim 8 wherein each of the anti-rotation links is pivotally connected to one of the adjacent ranks for pivoting about an axis corresponding to the transversely extending pivot axis of the outer pivot for the adjacent rank to prevent binding and rank wind-up during section flexing and help resist rank loads.

10. The frame section as set forth in claim 1 wherein the rank end support structure includes pivotal connections between the outer leg and the ranks, the pivotal connections defining transverse pivotal axes, and anti-rotation links pivotally connected to the ranks about axes corresponding to the transverse pivotal axes to reduce rank twisting during section flexing.

11. A flexible frame section for an agricultural implement frame adapted for movement over the ground in a forward direction and supporting earthworking tools, the frame including an inner section having an outer support area, the flexible frame section including:

at least a first elongated, transversely extending tool-carrying rank of preselected length having an innermost end and an outermost end, pivot structure connecting the innermost end to the outer support area for pivoting about a fore-and-aft extending folding axis, the pivot structure resisting rotation of the first rank about the length of the rank;

a transversely extending support frame having an inner end and an outermost support member extending generally in the fore-and-aft direction, the support frame defining a transversely extending support frame rank;

support frame hinge structure connecting the inner end of the support frame to the outer support area for pivoting relative to the inner section about the folding axis, the support frame hinge structure including transverse pivot structure facilitating pivoting of the support frame about a second axis transverse to the forward direction; and rank support structure connecting the first rank to the outermost support member, the pivoting of the support frame about the second axis facilitating relative vertical movement of the outermost end of the first rank relative to the support frame rank for frame section flexing.

12. The frame section as set forth in claim 11 including a second tool-carrying rank pivotally connected to the outer support area for pivoting about the folding axis and having an outer end pivotally connected to the outermost support member of the support frame, wherein the outer end of the second rank is movable vertically relative to the outermost end of the first rank as the implement moves over the ground.

13. The frame section as set forth in claim 11 including an anti-rotation link connected to the first rank and the and further resisting rotation of the first rank to thereby help eliminate depth control variations in the earthworking tools caused by rank rotation.

14. The frame section as set forth in claim 11 wherein the support frame comprises an L-shaped member having a long leg and a base defining an L, the long leg defining the transversely extending support frame rank and the base defining the outermost support member, the base extending in the fore-and-aft direction.

15. The frame section as set forth in claim 14 wherein the long leg of the L has an end portion mounting the support frame hinge structure.

16. The frame section as set forth in claim 14 wherein the base of the L has a forwardmost extremity connected to support wheel structure offset in the fore-and-aft direction and out of interfering relationship with tools mounted on the first rank.

17. The frame section as set forth in claim 16 further including second support wheel structure connected to the support frame rank out of interfering relationship with tools mounted on the support frame rank.

18. The frame section as set forth in claim 12 wherein the support frame hinge structure includes a hinge connecting the second rank to the outermost support member and having a transverse pivotal axis, the frame section further including an anti-rotation link pivotally connected to the second rank by a link pivot having an axis corresponding to the transverse pivot axis to reduce link twisting when the frame section flexes.

19. The frame section as set forth in claim 14 wherein the L-shaped member has a vertex, and further comprising a diagonal link extending from the vertex to the outer support area and providing shape stability for the frame section independently of any hitch structure extending forwardly of the implement frame sections.

20. The frame section as set forth in claim 16 wherein the base of the L is hollow, and a lift linkage is supported in the base and operably connected to the lift wheel structure, and a lift cylinder connected to the support frame and to the lift linkage.

* * * * *